US005853530A

United States Patent [19]
Allen

[11] Patent Number: 5,853,530
[45] Date of Patent: Dec. 29, 1998

[54] LABEL APPLICATOR

[75] Inventor: George Allen, Irvine, Calif.

[73] Assignee: Label Aire Inc., Fullerton, Calif.

[21] Appl. No.: 833,967

[22] Filed: Apr. 11, 1997

[51] Int. Cl.[6] .......... B32B 31/00

[52] U.S. Cl. .......... 156/541; 156/542; 156/DIG. 33; 156/DIG. 38

[58] Field of Search .......... 156/540, 541, 156/542, DIG. 38, 556, DIG. 33

[56] References Cited

U.S. PATENT DOCUMENTS

| | | | |
|---|---|---|---|
| 4,124,429 | 11/1978 | Crankshaw . | |
| 4,210,484 | 7/1980 | Crankshaw et al. . | |
| 4,255,220 | 3/1981 | Kucheck et al. . | |
| 4,267,004 | 5/1981 | Anderson | 156/542 X |
| 4,314,869 | 2/1982 | Crankshaw . | |
| 4,337,108 | 6/1982 | Crankshaw et al. . | |
| 4,566,933 | 1/1986 | Crankshaw et al. . | |
| 4,581,094 | 4/1986 | Sato | 156/DIG. 38 |
| 4,612,079 | 9/1986 | Ostrow . | |
| 4,830,701 | 5/1989 | Crankshaw et al. . | |
| 4,844,771 | 7/1989 | Crankshaw et al. . | |
| 5,022,954 | 6/1991 | Plaessmann | 546/542 |
| 5,232,540 | 8/1993 | Southwell et al. | 156/542 X |
| 5,306,375 | 4/1994 | Leonard | 156/542 X |
| 5,470,420 | 11/1995 | Yokajty | 156/542 X |

*Primary Examiner*—James Engel
*Attorney, Agent, or Firm*—Donald E. Stout

[57] ABSTRACT

An apparatus and associated method for applying a label to an article comprising a supporting structure, a label receiver having a receiving face and being adapted to receive and releasably retain a label, and a label dispenser. The label dispenser being adapted to dispense a label onto the receiving face. The dispenser being further adapted to blow a flow of gas against the trailing and lower edges of the label as it is being transferred from the label dispenser onto the receiving face to assist in moving the label onto the receiving face. The receiving face is fitted with a stop plate which prevents the label from being pushed beyond the receiving face and from being mis-positioned. After positioning, the label on the receiving face, the label is applied to the article.

15 Claims, 3 Drawing Sheets

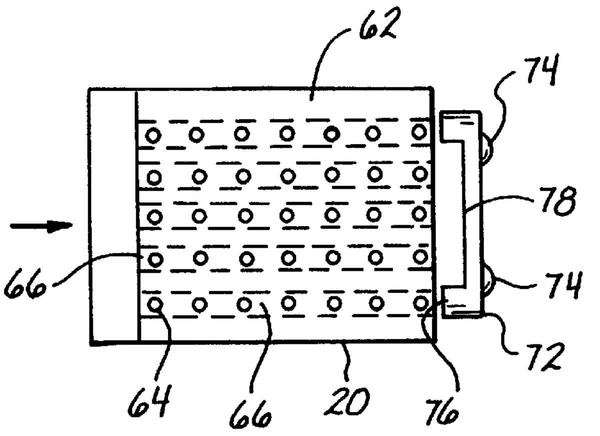
FIG. 5
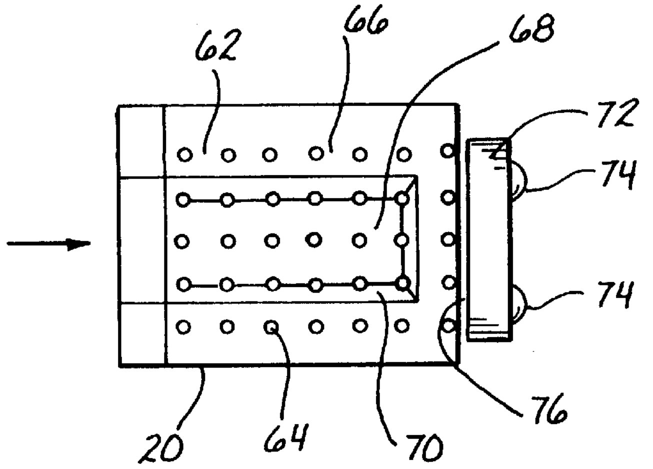
FIG. 6
FIG. 3
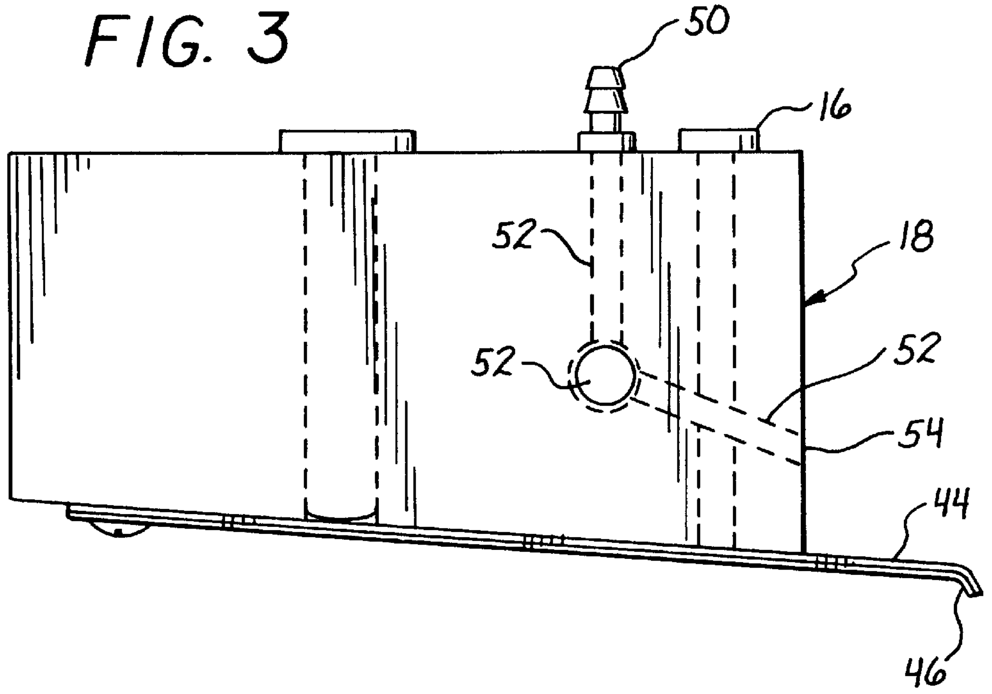

LABEL APPLICATOR

FIELD OF THE INVENTION

This invention relates generally to label applicators and more particularly, to an improved label applicator for applying modern adhesive backed labels to articles.

BACKGROUND OF THE INVENTION

In a conventional label application process, a label applicator applies labels to articles as the articles are advanced through a label applying station. The labels are generally transferred from the label applicator to the article by tamping the label onto the article or by blowing the label onto the article, or by a combination of both methods.

In a typical label applicator using one of the aforementioned processes, a label having a pressure sensitive adhesive applied to its bottom surface is removed from a backing strip or web at a label dispensing station. The label is then transferred to a receiving or labeler face on a label receiver. The label is retained against the receiving face by either a negative pressure or a Bernoulli effect applied through passageways extending through the label receiver to openings in the label receiving face. When the article to be labeled reaches an appropriate position at the labeling station, the label is pressed onto the article. Alternatively, a blast of gas, such as pressurized air, is passed through openings in the label receiving face to transfer the label from the label receiver to the article. The pressure sensitive adhesive adheres the label to the article. This transfer may also take place after moving the label receiver with a label towards the article then releasing the label. Label applicators of this general type are shown in Kucheck et al., U.S. Pat. No. 4,255,220, and Crankshaw et al., U.S. Pat. No. 4,844,771, both of which are herein incorporated by reference.

Proper operation of these label applicators requires that the labels be fully located on the label receiving face. Further, proper placement and alignment of the label on the article requires that the label be positioned accurately within a predetermined location on the label receiving face. This is particularly true for high accuracy label placement and for smaller sized articles.

Recent advances in the design and manufacturing of labels and their adhesive backings has led to major changes in the types and styles of labels used. Differing labels, including newly developed security and source tags, may have different size, weight, thickness, and adhesive characteristics that are not generally compatible with the currently available label applicators.

For example, some of these modern labels, such as source tags supplied by Sensomatic of Deerfield Beach, Fla., have a double sided adhesive covering only a portion of their lower surface. This partially covered lower surface is generally not compatible with the current label applicator devices that anticipate a lower surface that has been completely covered with adhesive. The cohesion attaching each label to the carrier or backing strip is used by the label dispenser to drive each label off of the backing strip and onto the label receiver. The label dispenser cannot drive any portion of the label that is not covered by adhesive or otherwise adhered to the backing strip. Without adhesive covering the entire lower surface of the label, the label can hang up on the label dispenser, resulting in a failed transfer to the label receiver.

Thus, the labels may not be properly transferred from the label dispensing device to the label receiver due to the lack of adhesive between the label and the backing strip. Even if the labels are transferred onto the label receiving face, they may not be properly positioned, which can lead to machine jams and inaccurate label placement on the article. Thus, there is a need for a label applicator that can properly transfer various labels that do not have adhesive applied to their entire lower surface. There is also a need for such an assembly that can be adapted to existing label applicators, eliminating the need to completely replace an existing label applicator.

An increasing demand for higher accuracy label to article placement has increased the need for accurately placing the label onto the label receiving face. This is emphasized by the increasingly smaller articles required to be labeled, for example, jewel boxes for storing compact discs. The exact location on the article to which the label will be applied often depends upon where the label is retained against the label receiving face. Currently, the label can be retained anywhere on the label receiving face. Thus, there is a need for a label applicator which accurately and efficiently transfers labels onto the label receiving face.

Many variations and styles of this general label applicator exist, however all tend to have similar problems transferring certain state of the art labels and source tags from the label dispenser onto the label receiving face. There is thus a need for an apparatus and method which can be used alone or as a modification to existing label applicators such that they are compatible with and can accurately apply these newer labels. There is also a need for such an apparatus to be simple to install and relatively inexpensive.

SUMMARY

The present invention satisfies the need for a label applicator that can effectively and accurately apply modern labels to articles. The present invention satisfies this need by providing a label applicator which can readily transfer modern labels, including source tags or almost any other labels having a relative thickness and stiffness from a label dispenser to a receiving face without hanging up, binding, discharging, or other failure. This includes transferring labels having an adhesive applied to only a portion of their lower surface. The label applicator of the present invention also provides a label stopping device which assists in stopping the forward motion of each label on the receiver face as well as accurately locating the label on the receiving face. This in turn allows for more accurate label placement on the article. The label applicator of the present invention additionally provides a receiving face with an improved surface for retaining and applying labels.

Some of the features of the present invention can be embodied in a label applicator which includes a supporting structure, a label receiver having a receiving face adapted to receive and releasably retain a label, and a label dispenser. The label dispenser is mounted to the supporting structure and dispenses labels which are transferred onto the receiving face.

An air assist, integral with the label dispenser, directs a flow of air against the bottom or adhesive side of the label and towards the receiving face. This flow of gas assists in dispensing the label by assisting in the removal of the label from the backing strip. This air assist may also be used to assist in holding the label against the receiving face.

The receiving face has a plurality of openings which extend perpendicularly through the label receiver. At least some of these openings are connected with a supply of pressurized gas for transmitting a blast of the gas against the label maintained on the label receiver. This blast forces the label off of the receiving face and onto the article.

In another aspect of the present invention, a manifold is mounted to the label dispenser and includes at least one passageway adapted for fluid connection with a supply of pressurized gas. The other end of the passageway terminates in an orifice. The orifice directs the flow of gas against the rear of the label and towards the label receiver as the label is transferred from the label dispenser onto the label receiver. This flow of gas helps move the label off of the label dispenser onto the receiving face. This is particularly useful for labels having a relative thickness and which do not have adhesive covering their entire lower surface, since these labels tend to be poorly transferred by the label dispenser alone.

In yet another aspect of the present invention, the label applicator includes a stop member mounted against the receiving face. The stop member prevents movement of the label beyond a certain point on the receiving face. When used in conjunction with the flow of gas from the manifold, the label is prevented from being blown or otherwise moved past a designated position on the receiving face. The stop member also accurately positions the label on the receiving face.

In yet another embodiment of the present invention, the receiving face has a machined recess or label indentation. This recess acts to direct and locate the label on the receiving face and prevent any further movement. Thus, the recess provides for highly accurate positioning of the label on the receiving face. The machined recess is also advantageous when using a tamping method of applying labels which have a thickness since the labels may otherwise be crushed or damaged during the tamping operation.

In another aspect of the present invention, the receiving face is provided with a plurality of grooves. The grooves are generally aligned, such that each of the openings is located within a groove. The grooves provide a smooth distribution of reduced pressure when moving a label from the label dispenser onto the receiving face and also assist in preventing the label from being mis-positioned on the receiving face.

According to a preferred method of the present invention, a supply of labels is provided to a label dispenser, where they are removed from a label backing strip or other carrying strip. Prior to reaching the label dispenser, the backing strip is passed over an idler roller which breaks the adhesive attaching the label. After this predispensing step, the backing strip is directed over a peeler bar on the dispenser. In this fashion, each label that passes over the peeler bar is fully dispensed from the backing strip. Each dispensed label is then transferred, one at a time, onto a label receiver. The label receiver includes a receiving face with a plurality of passageways. The passageways extend from a plurality of openings in the receiving face through the label receiver and are attached to sources of negative and positive pressure as will be described.

A vacuum is applied to at least some of the passageways through the label receiver such that a reduced pressure is created adjacent the receiving face. Because of this reduced pressure, an adjacent label is attracted to and retained against the openings in the label receiving face. Meanwhile, an article to be labeled is moved to a labeling station adjacent to the receiving face.

When the label is to be applied, a blast of gas is applied through at least some of the passageways in the label receiver and thus against the label retained against the receiving face. This blast of gas acts to remove the label from the label receiving face and transfer the label to the surface of the article. In addition to the above blast of gas, the label receiver may also be moved towards the article while still retaining a label on the receiving face just prior to application.

In another aspect of the present invention, the method includes directing a flow of gas against the trailing edge or rear of the label and towards the label receiving face. This flow of gas pushes the label, helping to move the label off of the label dispensing device and onto the receiving face. This gas assist is also used to direct the label onto the desired location of the receiver face.

A gas assist is also directed against the bottom of each label as it is being dispensed from the backing strip at the peeler bar to assist in the dispensing step and to assist in pushing and retaining the label against the receiving face. This flow of gas is typically distributed from an air assist integral with the label dispenser and just below the peeler bar.

The forward movement of the label on the label receiving face is then stopped using a stop plate. This step prevents movement of the label beyond a certain point on the label receiving face. The stop plate is configured with guides to assist in aligning the label on the receiving face.

The invention, together with additional features and advantages thereof, may be best understood by reference to the following description taken in conjunction with the accompanying illustrative drawings. In these accompanying drawings, like reference numerals designate like parts throughout the figures.

BRIEF DESCRIPTION OF THE DRAWINGS

FIG. 3 is a side view of a label sensing device as shown in FIG. 1, showing a manifold embodying the features of the present invention.

FIG. 5 is a bottom view of the label receiver as shown in FIG. 1, illustrating the stop member.

FIG. 6 is a bottom view of the label receiver and stop member as shown in FIG. 1 illustrating a recess in the label receiving face.

DETAILED DESCRIPTION

Figure 1:
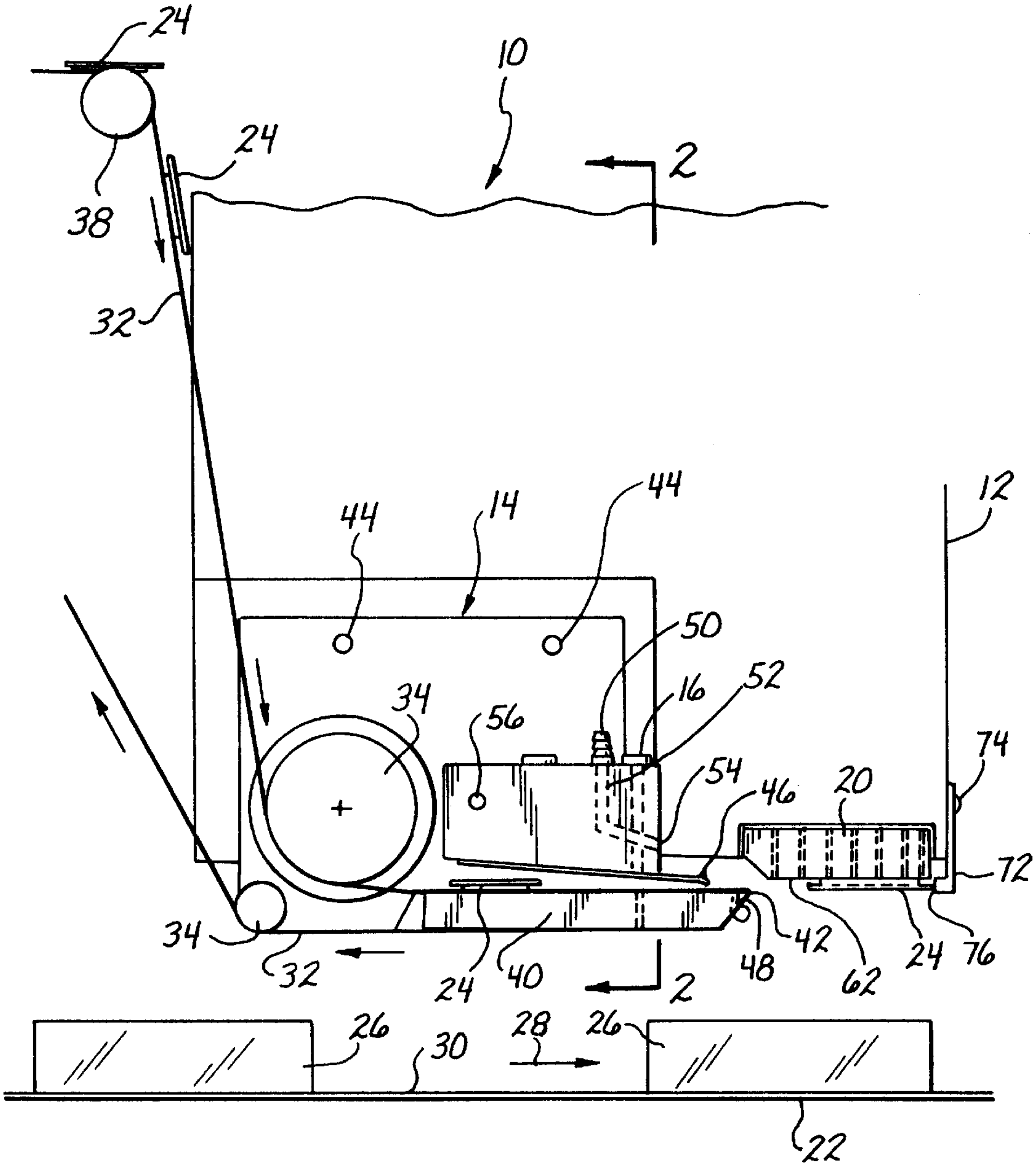
FIG. 1 is a front view of a label applicator embodying the features of the present invention.
Figure 2:
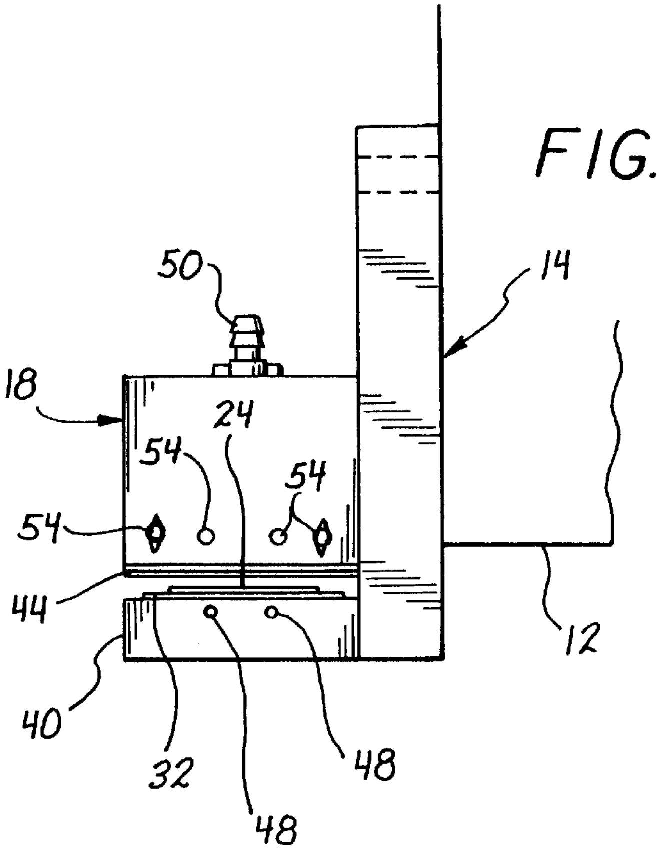
FIG. 2 is a sectional view of the label applicator of FIG. 1 taken along line 2—2 of FIG. 1, showing the front of the manifold and air assist orifices.

Referring now to FIGS. 1–2, a preferred embodiment of a label applicator formed in accordance with the present invention will be described. The label applicator assembly 10 includes a supporting structure 12, a label dispenser 14, a label sensing device 16, a gas-assist manifold 18 and a label receiver 20. The label dispenser 14, label sensing device 16 and manifold 18 are generally mounted on the supporting structure 12. The label receiver 20 may also be mounted to the supporting structure 12 and may be movably mounted for tamping or for a combination tamp-blow method of label application. However, the label receiver 20 may also be fixed relative to the supporting structure 12 for blow-method applications. In all embodiments, the label receiver 20 is generally located in a predetermined relationship to a labeling station or location 22 where a label 24 is generally applied to an article 26.

During operation, the article 26 is moved to the labeling station 22 for labeling as depicted by arrow 28. The article 26 is generally moved to the labeling station 22 using any suitable means. Preferably, a conveyor or conveyor unit 30 or other continuous delivery system is used. The conveyor unit 30 may be of various different constructions including roller beds or fluid channels, for example. However, any suitable technique for moving articles 26 to the labeling station 22 may be used. A hold down device (not shown) may be used to hold each article 26 to the conveyor unit 30. An article detection system, such as a photo detector device and circuit (not shown) may be used to detect the article 26 moving onto the labeling station 22. This is particularly useful when using a continuous motion article delivery system. As the article 26 is detected, a signal may be produced according to known techniques for use in activating the label applicator apparatus 10 so that a label 24 is applied to the positioned article 26.

The label dispenser 14 may be of various different kinds and embodiments. However, in the preferred embodiment illustrated, the label dispenser 14 is adapted for use with labels 24 having a relative thickness and a pressure sensitive adhesive applied to a lower or bottom surface. Preferably, these labels 29 will have a minimum thickness of approximately 0.025 inches. Such labels 24 may include source tags such as those of the type manufactured by Sensomatic in Deerfield Beach, Fla. or any other similar labels, source tags, or security labels and tags. The labels 24 are typically supplied on an elongated backing strip 32. The various tags and labels as described may also be provided in varying sizes. It is to be understood that the label applicator of the present invention encompasses being adapted for use with the various types and sizes of labels.

Generally and in broad terms, the label dispenser 14 may include an arrangement of rollers 34, a peeler bar 40 having a peeling edge or tip 42 and a pressure spring 44. At least one of the rollers 34 may be driven by a motor (not shown) to move the carrier or backing strip 32 from a supply reel (not shown) to and around a peeling edge 42 of the peeler bar 40. This movement sequentially removes the labels 24 from the backing strip 32 and directs them towards the label receiver 20 while the label receiver 20 is held stationary on the supporting structure 12.

The pressure spring 44, which is typically a flat plate spring, is mounted above the peeler bar 40 as is commonly known in the art of label applicators. However, the pressure spring 44 is preferably modified to assist in dispensing each label by retaining the rear or trailing edge of each label 24 against the peeler bar 40 while the backing strip 32 is being pulled away from the front or leading edge of the label 24 at the peeling edge 42.

In a preferred embodiment, the pressure spring 44 is advantageously configured with a downwardly disposed hook or lip 46. This hook 46 rides over the upper surface of the moving label or tag 24 and prevents the label 24 from making a sharp downwardly dive as it moves over the peeler bar 40 and is released from the backing strip 32. This action assists in transferring the label 24 from the label dispenser 14 to the label receiver 20 along a more direct or straight line path. Preferably, the downwardly disposed lip 46 extends downwardly from the pressure spring 44 a distance slightly less than the thickness of the labels 24 being applied. In this fashion, the downwardly disposed lip 46 extends downwardly approximately 0.02 to 0.06 inches from the generally flat surface of the pressure spring 44. In addition, the downwardly disposed lip 46 is angled slightly outwardly along the direction of travel of the labels 24 to provide a smooth transition when contacting the labels 24. Preferably, the downwardly disposed lip 46 is also oriented forwardly at an angle of approximately 15 to 75 degrees.

In a preferred embodiment, the label applicator assembly 10 predispenses the labels 24 from the label backing strip 32 prior to the backing strip 32 reaching the label dispenser 14. This predispensing may include passing the backing strip 32 over an idler roller 38 of sufficient diameter to separate the adhesive attaching the labels 24 to the backing strip 32. As the label 24 passes this dispenser roller 38, the leading or front end of each label 24 is separated from the backing strip 32 as it pulled around the predispenser roller 38 at a smaller radius than the label 24 can bend. As the label 24 continues around the roller 38, it is reattached to the backing strip 32. However, even after reattachment the cohesion between label and backing strip is reduced and thus minimize the effort required to dispense the label from the backing strip at the label dispenser 14. In a preferred embodiment, an idler roller 38 of approximately one inch diameter, which sufficiently breaks the adhesion between the leading edge of the labels 24 and the backing strip 32 is employed through use of an idler roller 38 of greater than one inch diameter is possible but may result in less predispensing action. This predispensing step advantageously solves the tight release problems encountered with the modern adhesively backed labels 24 described.

In the preferred embodiment, a gas or air assist device 48 directs a flow of gas, such as compressed air, at the lower or adhesive coated surface of each label 24 as it leaves the peeling edge 42 of peeler bar 40. This gas assist 48 may be provided from a supply tube or orifice (not shown) located in or below the peeler bar 40 and connected through gas tubing or other ducting to a supply of compressed gas. This flow of gas against the bottom of the label 24 assists in removing the label 24 from its label backing strip 32. By adjusting the force and direction of this flow, this air assist device 48 may also be used to assist in retaining the label 24 against the label receiver 20. In addition, a printer may be provided (not shown) which prints information on the label 24 while the label 24 is supported on the peeler bar 40.

The label dispenser 14 is generally mounted on supporting structure 12 using fasteners 48, but may alternatively be permanently attached if desired. Fasteners 48 may include bolts, screws, rivets, clips, or the like. Preferably, the dispenser 14 is removably and adjustably mounted to the supporting structure 12. This allows adjustment of the dispenser 14 in relation to the label receiver 20 to accommodate different label sizes and types. The dispenser 14 may be positionally adjusted in relation to the label receiver 20 through the use of slotted fastener holes in the dispenser (not shown), through a selection of fastener holes in the supporting structure 12, or the like.

If the dispenser 14 cannot be sufficiently adjusted positionally to accommodate a desired label, the dispenser 14 can be removed, and a different dispensing device installed in its place which is capable of accommodating the desired labels. In a similar fashion, the present invention contemplates a dispenser 14 which incorporates the teachings of this invention and which can be used to replace existing dispensers on existing label applicators, thus modifying the existing applicator to incorporate the teachings of the present invention.

Referring now in particular to FIG. 3, a label sensing device 16 may be provided to indicate whether a label 24 is available for removal by the peeler bar 40. This sensing device 16 may work in conjunction with the previously described article detection system for indicating whether the label applicator apparatus 10 is ready to transfer a label 24 or whether such a transfer was successful. A number of other indicator devices and circuitry may also be added to provide further information on the labeling operation. In a preferred embodiment, the label sensing device 16 includes a photoelectric sensor.

A gas assist device or manifold 18 for distributing a flow of gas to assist in moving the label 24 from the peeler bar 40 and onto the label receiver 20 includes a connector 50, at least one passageway 52 and orifices 54. The gas assist or manifold 18, similar to the gas assist 48 on the label dispenser 14, is connected to a supply of gas. This connection may be through the connector 50, which may comprise any type of fluid line or tubing connector as is known to those of skill in the art of pneumatics. In a preferred embodiment, the gas assists 18 and 48 are both compressed air. However, other gases, either compressed or supplied through mechanical means such as a fan may be used.

Passageways 52 are linked in fluid communication with the orifices 54. Orifices 54 may be a single orifice, a pair of orifices, or any number sufficient to assist in blowing a flow of the gas against the rear of the label 24. Orifice or orifices 54 typically have a diameter in the range of 0.012–0.125 inch (0.03–0.325 cm). However, a larger diameter may be used. In addition, a non-circular orifice, such as a flat fan-type orifice (not shown) may be used.

Figure 4:
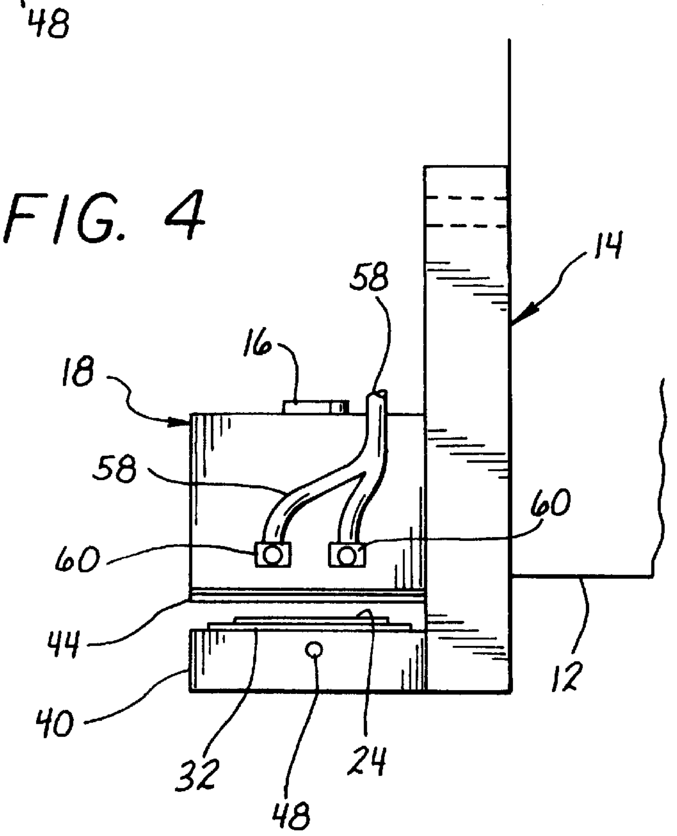
FIG. 4 is a sectional view of a label applicator according to the principles of the present invention, showing an alternative embodiment of the manifold.

In the embodiment as described in FIGS. 3 and 4, a pair of orifices 54 are located on either side of manifold 18 as shown. The orifices 54 are oriented such that the gas is blown against the rear or trailing edge of the label 24 generally in the direction of travel of the moving label 24. In this fashion, the flow of gas assists in propelling the label 24 forwardly onto the receiving face 62. However, the gas may be directed slightly downwardly onto the label 24. Orifices 54 may be jets, nozzles, both fixed and adjustable, or the like. In this fashion, both the manifold 18 and the air assist 39 may be used to assist in dispatching the label 24 from the label dispenser 14 and moving it onto the label receiver 20.

The manifold 18 is generally located in proximate relationship to the label receiver 20 and just above the pressure spring 44. This allows proper orientation to assist in the transfer of the label 24 onto the label receiver 20. The location of the manifold 18 in relation to the label receiver 20 and peeler bar 40 depends on the specific label 24 being applied and possibly on the flow volume and pressure of the applied gas. If a different label 24 or size is to be applied, manifold 18 may need to be repositioned in relation to the label receiver and peeler bar 40.

The manifold 18 is generally oriented such that orifices 54 direct sufficient gas flow and in a proper direction such that the rear portion or thickness of the labels 24 are effectively pushed away from the peeler bar 40 and forced forwardly onto the label receiver 20. Alternatively, at least some of the orifices 54 may be directional such that the direction of the gas flow may be adjusted at each orifice 54 without repositioning the manifold 18. In this way, the labels 24 may be effectively "steered" in their forward motion off of the peeler bar 40. Such directional orifices may include adjustable jets or nozzles which may enable adjustment of both direction and the pattern of the flow. The manifold 18 may also include a regulator and valves (not shown) for adjusting the pressure, flow and duration of the discharging gas. It should be noted that the label applicator assembly 10 preferably includes both a flow of gas from the manifold to push the label 24 forwardly and a flow of gas from the orifice located adjacent the peeler bar 40 to assist in dispensing the label, as well as pushing the label against the label receiver 20.

Manifold 18, as well as the label sensing device 16, if provided, may comprise individual parts or may be a single assembly, as shown in FIG. 1. These devices are preferably mounted to the label dispenser 14. Alternatively, the manifold 18 may be attached directly to the supporting structure 12, or may be an integral part of the label dispenser 14. The manifold 18 may be adjustably attached to the supporting structure 12 or to the label dispenser 14 through the use of at least one fastener such as a bolt, screw, or the like. However, permanent mounting may be accomplished through welding or riveting or in the alternative, the label sensing device 16, if supplied, and the manifold 18 may even be an integral part of the dispenser 14. This is particularly desirable for label applicators that are dedicated to a specific label type and size.

In the embodiment illustrated in FIGS. 1–2, the manifold 18 and label sensing device 16 are attached to the label dispenser 14 using a mechanical fastener 56. Adjusting the orientation of the manifold 18 is accomplished by moving the label dispenser 14 in relation to the supporting structure 12 through the fastener 44. Thus, the label dispenser 14 may be adjusted to adapt to differing size, thickness and types of labels 24 as described above or to adjust and orient the manifold 18.

In an alternative embodiment as illustrated in FIG. 4, the manifold 18 may comprise tubing 58 which is adapted for connection to a supply of compressed air at one end and separated into a number of orifices or jets 60 at the other end. The tubing 58 may be of any suitable diameter and flexibility such that the supply nozzles 60 are adequately supplied for moving the label 24. The tubing 58 is secured to the dispenser 14 or to the supporting structure 12 such that the nozzles 60 may be oriented to blow air against the rear of the label 24 and towards the label receiver 20.

Referring now to FIGS. 1 and 5, label receiver 20 has a receiving face 62 onto which the label 24 is dispensed from the dispenser 14. The receiving face 62 includes openings 64 which extend from the receiving face 62 through the label receiver 20 and are fluidly connected to a device (not shown) capable of producing a negative pressure at openings 64. In a preferred embodiment, the negative pressure is a vacuum and the device may be a vacuum pump. However, compressed air in conjunction with a venturi may alternatively be used. The label receiver may also be fitted with a chamfered front end to facilitate the transfer of labels onto the receiving face.

As is known in the art, at least some of the openings 64 are in connection with a controllable supply of pressurized gas, such as compressed air. This connection may include a shutoff valve such that when not actuated, any vacuum being drawn through common openings 64 is not affected but merely overcome. In a preferred embodiment, a four-way valve (not shown) may be used. With this configuration, the compressed air may be blasted through the openings 64 to remove the label 24 from the receiving face 62 and to transfer the label 24 to the article 26. This blast may occur while pulling the described vacuum or alternatively after the vacuum has been shut off by the valve.

The receiving face 62 is preferably a generally planar surface. In one embodiment, grooves 66 are cut into the label receiving faces 62 and connect a plurality of the openings 64. The grooves 66 may be parallel and extend in the direction that the label 24 moves or may alternatively extend perpendicularly to the path of labels 24. In other configurations, the grooves 66 may extend along any desired path and simply join a number of openings 64. The grooves 66 act to provide a more continuous distribution of negative pressure and of positive pressure gas such that the label is more effectively transferred onto and off of the receiving face 62.

In another embodiment as shown in FIG. 6, the receiving face 62 may have a recess 68. The recess 68 is particularly helpful with source tags and other labels that have a relative thickness and when using a tamping type of label application. The recess 68 is generally larger than the upper surface of desired labels 24 and deep enough to securely fix the label 24 on the receiving face 62 while protecting any internal mechanisms from damage during any tamping operations. The recess 68 may be a formed part of the receiving face 62 or may be machined or formed in any suitable fashion. The recess 68 preferably has chamfered edges 70, and particularly a smooth chamfered front edge for assisting in positioning of the label 24 into the recess 68. The distal edge of the recess is preferably not chamfered, so that this edge advantageously stops the forward motion of the label 24. The recess 68 may also have grooves 66 with integral openings 64, as previously described.

A stop plate 72 is preferably mounted to the supporting structure using fasteners 74. These fasteners 74 may be bolts, screws, rivets, clamps, or the like. The stop member 72 is mounted adjacent to the label receiver 20 and has a generally flat face 76 which may overlap the receiving face 62 for stopping the label 24. The generally flat face 76 may have a channel 78 or a number of channels (not shown) to facilitate alignment of the label on the receiving face 62, as well as to assist the transfer of the label 24 onto and off of the receiving face 62. The stop plate 72 may preferably be made from a sheet metal or formed from a plastic. However, most any material may be used. For labels 24 having internal circuitry, the stop plate 72 may be made from a non-conductive material or coated with a non-conductive material such as a plastic. In addition, the stop plate 72 may be made from a material to which the adhesive of the label will not stick.

The stop plate 72 is adapted to stop the label 24 from traveling too far forward on the receiving face 62 as it is transferred from the dispenser 14. The stop plate 72 is particularly useful when using the manifold 18 and air assist 39, either alone or in combination, to assist in moving the label 24 onto the receiving face 62. The stop plate 72 may also be configured with sides to assist in accurately locating the label 24 on the receiving face 62, which in turn permits more accurate placement of the label 24 on the article 26. This may be accomplished by forming sides which extend along the receiving face 62 and act as guides to direct the label 24 into the center of the stop plate 72. For maximum label placement accuracy, the stop plate 72 may be adapted to specifically fit the particular label being applied. The stop plate 72 may also be configured such that it is recessed during a tamping operation. In this configuration, the stop plate 72 may be spring mounted to the supporting structure 12.

While this invention has been described with respect of various specific examples and embodiments, it is to be understood that the invention is not limited thereto and that it can be variously practiced within the scope of the following claims.

What is claimed is:

1. A label applicator for applying a label having an adhesive side and a non-adhesive side to an article, comprising:

a supporting structure;

a label receiver having a receiving face which is adapted to receive and releasably retain a label, the receiving face having a plurality of openings in fluid connection with a plurality of passageways extending through the label receiver, at least some of the plurality of passageways being adapted for connection to a supply of compressed gas and for transmitting a blast of the gas through at least some of the plurality of openings and against the label retained on the receiving face to transfer the label to the article;

a label dispenser mounted to the supporting structure for dispensing a label in a predetermined direction of travel onto the receiving face; and a manifold having a passageway with a first end for fluid connection with a supply of gas, said passageway being in fluid connection with at least one orifice for discharging a flow of said gas against the rear and across the non-adhesive side of the label and towards the label receiver to assist in moving the label onto the receiving face; wherein said orifice is oriented so that said gas discharge flows in a direction ranging from parallel to away from said receiving face.

2. The apparatus for applying a label as recited in claim 1 wherein the manifold is mounted to the supporting structure.

3. The apparatus for applying a label as recited in claim 1 wherein the manifold is adjustably attached to the supporting structure.

4. The apparatus for applying a label as recited in claim 1 wherein said at least one orifice has an adjustable nozzle for directing the angle of said discharging gas against the rear of the label.

5. The apparatus for applying a label as recited in claim 1 wherein said manifold comprises tubing.

6. The apparatus for applying a label as recited in claim 1 wherein the supply of gas is compressed air.

7. The apparatus for applying a label as recited in 6, wherein said at least one orifice comprises two orifices.

8. The apparatus for applying a label as recited in claim 1 and further comprising a stop member mounted against the label receiver for stopping the label in a desired location on the receiving face.

9. The apparatus for applying a label as recited in claim 8 wherein the stop member has a face for contacting the label and wherein the face has at least one channel.

10. The apparatus for applying a label as recited in claim 8 wherein the receiving face further comprises a recess for accepting an upper portion of the label.

11. The apparatus for applying a label as recited in claim 10 wherein the recess is larger than the upper portion of the label and wherein the recess includes at least some chamfered edges.

12. The apparatus for applying a label as recited in claim 8 wherein the stop member is removably attached to the supporting structure.

13. The apparatus for applying a label as recited in claim 1, and further comprising a gas assist orifice disposed on said label dispenser.

14. The apparatus for applying a label as recited in claim 13, wherein said label dispenser gas assist orifice is oriented to discharge gas along the direction of travel of said label and toward said receiving face, such that the gas discharged from said label dispenser gas assist orifice flows in a direction which intersects the direction of flow of gas discharged from said manifold gas discharge orifice.

15. A label applicator for applying a label to an article, comprising:

a supporting structure;

a label receiver having a receiving face which is adapted to receive and releasably retain a label, the receiving face having a plurality of openings in fluid connection with a plurality of passageways extending through the label receiver, at least some of the plurality of passageways being adapted for connection to a supply of compressed gas and for transmitting a blast of the gas through at least some of the plurality of openings and against the label retained on the receiving face to transfer the label to the article;

a label dispenser mounted to the supporting structure for dispensing a label onto the receiving face;

a manifold having a passageway with a first end for fluid connection with a supply of gas, said passageway being in fluid connection with at least one orifice for discharging a flow of said gas against the rear of the label and towards the receiving face to assist in moving the label onto the receiving face;

a stop member mounted against the label receiver for stopping the label in a desired location on the receiving face, wherein the stop member has a face for contacting the label and wherein the face has at least one channel.

* * * * *